United States Patent
Na et al.

(10) Patent No.: US 7,748,637 B2
(45) Date of Patent: Jul. 6, 2010

(54) SMART CARD WITH LASER ATTACK DETECTOR

(75) Inventors: Ji-Myung Na, Gyeonggi-do (KR); Min-Kyu Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 402 days.

(21) Appl. No.: 11/985,693

(22) Filed: Nov. 16, 2007

(65) Prior Publication Data

US 2008/0128516 A1    Jun. 5, 2008

(30) Foreign Application Priority Data

Nov. 16, 2006    (KR)    ............. 10-2006-0113427

(51) Int. Cl.
*G06K 19/06*    (2006.01)
(52) U.S. Cl. ..................... 235/492; 235/380
(58) Field of Classification Search ............. 235/380, 235/382, 382.5, 439, 492
See application file for complete search history.

(56) References Cited

U.S. PATENT DOCUMENTS

| | | | |
|---|---|---|---|
| 6,964,378 B2 * | 11/2005 | Taddiken | 235/492 |
| 7,311,257 B2 * | 12/2007 | Silverbrook | 235/454 |
| 2003/0133241 A1 | 7/2003 | Feuser et al. | 361/92 |
| 2004/0120195 A1 | 6/2004 | Okuda | 365/200 |
| 2008/0059741 A1 * | 3/2008 | Croguennec et al. | 711/163 |

FOREIGN PATENT DOCUMENTS

| | | |
|---|---|---|
| KR | 10-2004-0053803 | 6/2004 |
| KR | 1020050066558 | 6/2005 |

\* cited by examiner

*Primary Examiner*—Seung H Lee
(74) *Attorney, Agent, or Firm*—Myers Bigel Sibley & Sajovec (57) ABSTRACT

A smart card includes a plurality of function blocks, and a laser attack detector configured to detect an external laser attack on at least one of the plurality of function blocks. The laser attack detector may include a plurality of chain blocks connected in a chain configuration, and each of the chain blocks is configured to change the level of a detection value stored therein in response to an external laser attack.

35 Claims, 7 Drawing Sheets

SMART CARD WITH LASER ATTACK DETECTOR

CROSS-REFERENCE TO RELATED APPLICATIONS

This U.S. non-provisional patent application claims priority under 35 U.S.C. §119 to Korean Patent Application No. 10-2006-113427, filed on Nov. 16, 2006, the disclosure of which is hereby incorporated by reference.

BACKGROUND

The present invention relates to smart cards, and more particularly, to smart cards with anti-hacking features.

A smart card is a plastic card that includes a microprocessor and a memory and thus can both store information and process the information stored therein. Smart cards are emerging as a next-generation multimedia information medium because they have relatively high security, are more stable than magnetic stripe cards, and are more resistant to data erasure. However, more attention is being focused on security issues as smart cards are becoming more widely used in various fields such as finance, communication, and distribution.

Typically, a smart card includes a light detector, an inner insulation removal detector, and/or an active shield removal detector in order to prevent or respond to hacking attacks. When a hacker directs light into a card chip in order to see the pattern of the smart card, the light detector detects the light and responsively outputs a detection signal. When a hacker removes an insulating layer for protecting a card chip, the inner insulation removal detector detects the removal of the insulating layer and responsively outputs a detection signal. When a hacker removes a shield protecting a metal line (e.g., a signal line of a card chip) in order to access the metal line, the active shield removal detector detects the removal of the shield and responsively outputs a detection signal.

In response to a detection signal output from the light detector, the inner insulation removal detector and/or the active shield removal detector, the smart card can reset one or more of the circuits thereof, including the microprocessor. In this way, the smart card can reduce or prevent information leakage/destruction/modification due to an external attack and/or damage due to abnormal operating environments.

A light detector is typically large in size and cannot be disposed in the entire area of the smart card. Therefore, when a hacker attacks an area of the smart card in which the light detector is not disposed, for example using small-wavelength high-energy light such as laser light, the light detector may not detect such an external laser attack. The inner insulation removal detector or the active shield removal detector can detect an external attack made by removal of a physical chip protection layer, but may not detect such an external laser attack.

SUMMARY

The present invention provides smart cards that can prevent hacking by detecting an external laser attack on the entire area of the smart card.

A smart card according to some embodiments of the invention includes a central processing unit (CPU), a memory configured to store data and/or instructions processed by the CPU, a TX/RX interface configured to exchange data with an external device, and a laser attack detector configured to detect an external laser attack on at least one of the CPU, the memory, and/or the TX/RX interface. The laser attack detector may include a plurality of chain blocks connected in a chain configuration, and each of the chain blocks may be configured to change the level of a detection value stored therein in response to an external laser attack.

The smart card may include a plurality of function blocks, and at least one of the plurality of chain blocks may be associated with each of the plurality of function blocks of the smart card.

The laser attack detector may be configured to operate as a dummy logic during an initialization mode of the laser attack detector.

In some embodiments, initial detection values of each of the plurality of chain blocks may have the same level.

The detection value of a last chain block of the plurality of chain blocks may include a hacking detection signal. The CPU may be configured to perform a reset operation in response to the hacking detection signal.

A smart card according to embodiments of the invention may further include a reset logic configured to reset the smart card in response to the hacking detection signal.

In an initialization mode, at least one of the chain blocks is configured to set an initial detection value therein in response to an initial detection value of a previous chain block in the chain configuration and an activated control signal generated by the previous chain block, and to generate an activated control signal.

In response to a supply voltage and a reset signal, a first one of the plurality of chain blocks is configured to set an initial detection value therein and to generate an activated control signal.

At least one of the plurality of chain blocks may be configured to set an initial detection value therein in response to the control signal and an initial detection value of a previous chain block in the chain configuration.

According to some embodiments, when at least one of the chain blocks detects the external laser attack, the at least one chain block having detected the external laser attack is configured to change a level of a detection value therein and to generate an activated control signal.

One or more of the plurality of chain blocks following the chain block having detected the external laser attack may be configured to change the level of the detection value therein in response to the activated control signal and the level-changed detection value of a previous chain block of the chain configuration, and to generate the activated control signal.

A last chain block of the plurality of chain blocks is configured to change a level of a detection value therein in response to the activated control signal and the level-changed detection value of a previous chain block.

Each of the chain blocks is configured to set an initial detection value therein in response to a reset signal during an initialization mode.

At least one of the chain blocks may include a flip-flop (FF) configured to set an initial detection value therein in response to the reset signal.

When at least one of the plurality of chain blocks detects the external laser attack, the at least one chain block having detected the external laser attack is configured to change the level of the detection value therein.

Chain blocks following the chain block having detected the external laser attack are configured to change a level of the detection value therein in response to the level-changed detection value of the previous chain block.

Each of the chain blocks may include a first detector configured to set an initial value of a first detection value and to generate an activated first control signal in an initialization mode, and a second detector configured to set an initial value of a second detection value and to generate an activated second control signal in the initialization mode. The initial first detection value and the initial second detection value may have different levels.

In the initialization mode, the first detector is configured to set the initial first detection value and to generate the first control signal in response to a second control signal and an initial second detection value of a previous chain block, and the second detector is configured to set the initial first detection value and to generate the second control signal in response to the first control signal and the first initial detection value of the first detector.

The first detector of a first chain block among the plurality of chain blocks is configured to set the initial first detection value and to generate the first control signal in response to a supply voltage and a reset signal.

The second detector of a last chain block among the plurality of chain blocks is configured to set the initial second detection value in response to the first control signal and the initial first detection value of the first detector.

When detecting the external laser attack, the first and/or second detector of at least one of the chain blocks is configured to change the level of the first and/or second detection value and to generate the activated first or second control signal.

When the level of the first detection value is changed, the second detector is configured to change the level of the second detection value and to generate the second control signal in response to the level-changed first detection value and the first control signal.

The first detector of each of the chain blocks following the chain block having detected the external laser attack is configured to change the level of the first detection value and to generate the first control signal in response to the level-changed second detection value and the second control signal of the previous chain block, and the corresponding second detector is configured to change the level of the second detection value and to generate the second control signal in response to the level-changed first detection value and the first control signal.

The second detector of the last chain block among the chain blocks is configured to change the level of the second detection value in response to the first control signal and the level-changed first detection value. The level-changed second detection value of the last chain block may include a hacking detection signal.

According to some embodiments, each of the chain blocks may include a first detector configured to set an initial first detection value in response to a reset signal in an initialization mode, and a second detector configured to set an initial second detection value in response to the reset signal in the initialization mode. The initial first detection value and the initial second detection value may have different levels. The first and/or second detector may include a flip-flop (FF) configured to set the initial first and/or second detection value in response to the reset signal.

Upon detecting the external laser attack, the first and/or second detector of at least one of the chain blocks is configured to change the level of the first or second detection value.

When the level of the first detection value is changed, the second detector is configured to change the level of the second detection value in response to the level-changed first detection value.

The first detector of each of the chain blocks following the chain block having detected the external laser attack is configured to change the level of the first detection value in response to the level-changed second detection value of the previous chain block, and the corresponding second detector is configured to change the level of the second detection value in response to the level-changed first detection value. The level-changed second detection value of the last chain block among the chain blocks may include a hacking detection signal.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Smart cards according to some embodiments of the present invention include a laser attack detector configured to detect an external attack that is made using a laser. Hereinafter, an external attack made using laser will be referred to as 'external laser attack.' When an external laser attack is made on any function block of the smart card, the laser attack detector detects the external laser attack and outputs an attack detection signal. In response to the attack detection signal output from the laser attack detector, the smart card may reset one or more, or in some embodiments all, of the circuits therein. In this way, the smart card can reduce or prevent the leakage/destruction/modification of information stored therein due to an external attack and/or damage due to abnormal operating environments.

Figure 1:
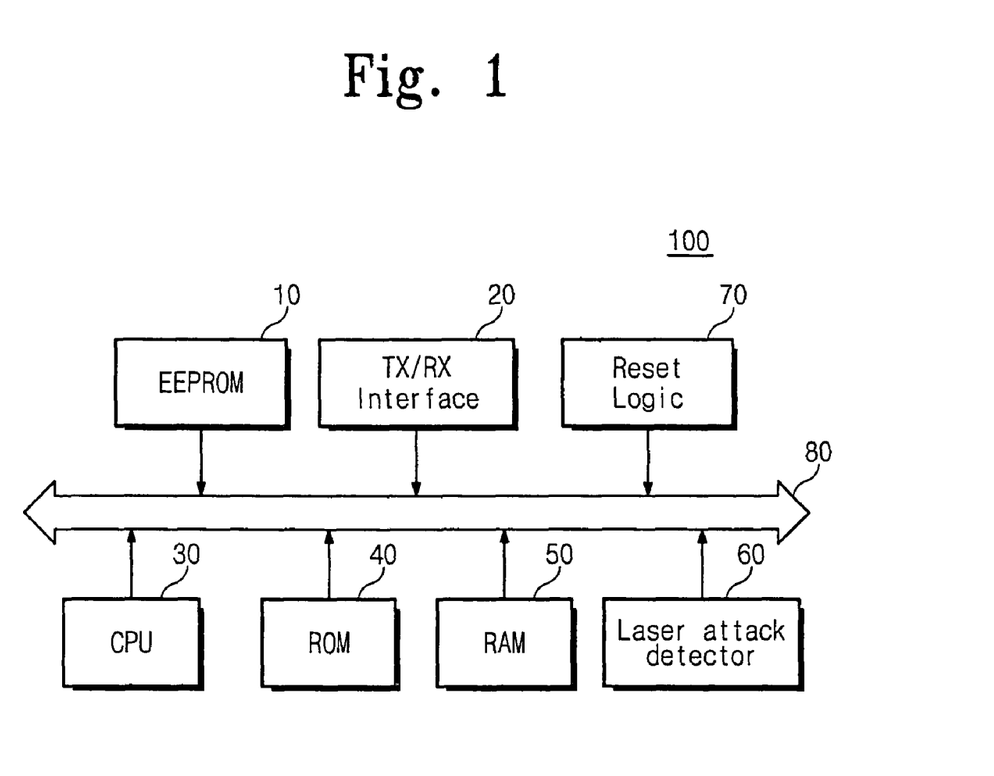
FIG. 1 is a block diagram of a smart card according to some embodiments of the present invention.

FIG. 1 is a block diagram of a smart card according to some embodiments of the present invention.

Referring to FIG. 1, a smart card 100 includes an electrically erasable programmable read only memory (EEPROM) 10, a TX/RX interface 20, a central processing unit (CPU) 30, a read only memory (ROM) 40, a random access memory (RAM) 50, a laser attack detector 60, a reset logic 70, and an address/data bus 80.

The CPU 30 controls the overall operation of the smart card 100. The memories 10, 40 and 50 are used to store data and instructions processed by the CPU 30. The TX/RX interface 20 is used to transmit data, addresses, and commands between the smart card 100 and an external device. In the event of an external laser hacking attempt (i.e., an external laser attack), the laser attack detector 60 detects the external laser attack and outputs a detection signal. In response to the detection signal output by the laser attack detector 60, the reset logic 70 can reset one or more circuits of the smart card 100, including the CPU 30 of the smart card 100.

The smart card 100 can reset one or more of the circuits thereof using the reset logic 70. However, there are various methods for resetting circuits of the smart card 100 in response to the detection signal from the laser attack detector 60 when there is an external laser attack. For example, without using the reset logic 70, the CPU 30 may perform a reset operation for resetting one or more of the circuits of the smart card 100 in response to the detection signal from the laser attack detector 60 when there is an external laser attack.

In an initialization mode, the smart card 100 receives a reset signal (not illustrated) from an external device (not illustrated) through the TX/RX interface 20. The received reset signal is transmitted through the address/data bus 80 to the laser attack detector 60. The laser attack detector 60 receives a supply voltage (not illustrated) and the reset signal, and sets an internal initial detection value in response to the supply voltage and the reset signal.

In the initialization mode, the laser attack detector 60 does not affect the operation of the smart card 100. That is, the laser attack detector 60 operates as a dummy logic in the initialization mode. Therefore, in the initialization mode, the reset logic 70 does not reset the circuits of the smart card 100 in response to a signal output from the laser attack detector 60.

When an external laser hacking attempt (i.e., an external laser attack) occurs on any area of the smart card 100, the laser attack detector 60 changes the level of an internally stored detection value as a result of the laser attack. For example, when there is an external laser attack on any one of the CPU 30, the TX/RX interface 20, and/or the memories 10, 40 and 50, the laser attack detector 60 changes the level of the internal detection value as a result. The level-changed detection value corresponds to the detection of the external laser attack. A detection signal is generated in response to the change of the level of the detection value. The reset logic 70 receives the detection signal of the laser attack detector 60 through the address/data bus 80, and may reset one or more of the circuits of the smart card 100 in response to the received detection signal.

The CPU 30, the TX/RX interface 20, and the memories 10, 40 and 50, which are included in the smart card 100, are function blocks, and the laser attack detector 60 can detect an external laser attack on one or more of the function blocks of the smart card 100.

Figure 2:
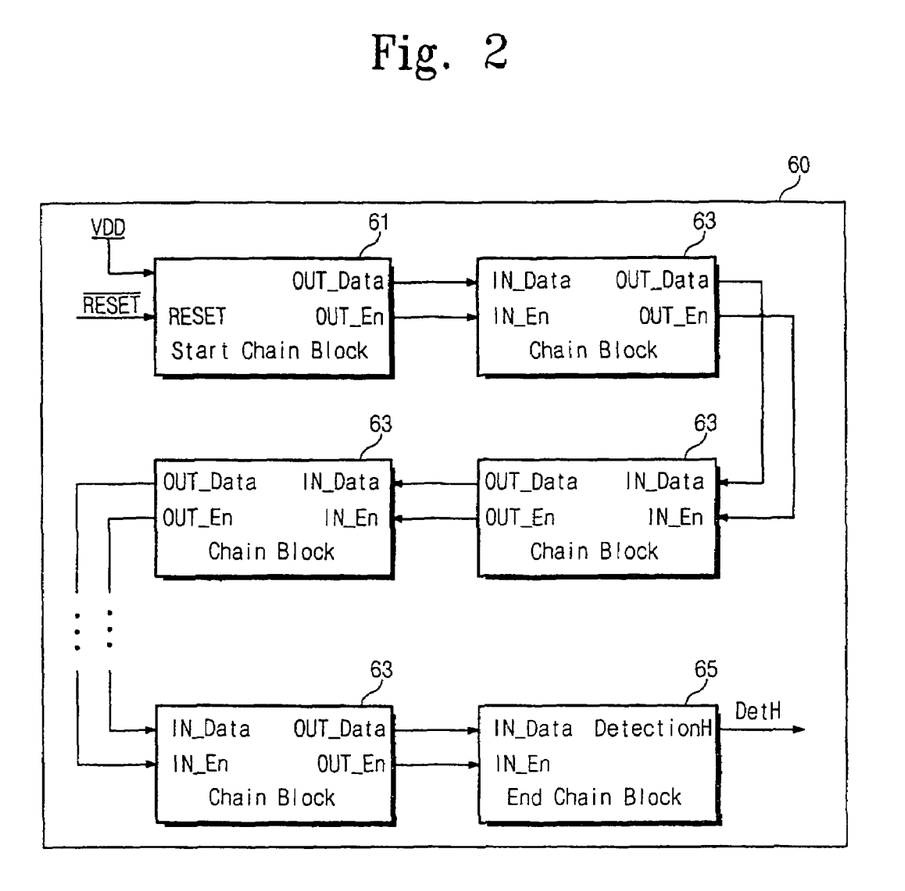
FIG. 2 is a block diagram of a laser attack detector illustrated in FIG. 1, according to some embodiments of the present invention.

FIG. 2 is a block diagram of the laser attack detector 60 illustrated in FIG. 1, according to some embodiments of the present invention.

Referring to FIG. 2, the laser attack detector 60 includes a plurality of chain blocks 61, 63 and 65 that are connected in a chain configuration. The chain blocks 61, 63 and 65 include a start chain block 61, followed by one or more intermediate chain blocks 63. The last chain block is an end chain block 65. Each of the start chain block 61, the intermediate chain blocks 63, and the end chain block 65 is configured to detect an external laser attack. Each of the intermediate chain blocks 63 receives an output value from a previous chain block, and generates an initial detection value or changes the level of the detection value in response to the output value received from the previous chain block. In addition, each of the intermediate chain blocks 63 provides the next chain block with a signal corresponding to a normal operation state or hacking detection state. The start chain block 61 and the end chain block 65 perform similar operations as the intermediate chain blocks 63. However, unlike the intermediate chain blocks 63, the start chain block 61 is not connected to a previous chain block and thus receives a supply voltage VDD and a reset signal $\overline{\text{RESET}}$ in the initialization mode in order to set an initial detection value. Unlike the intermediate chain blocks 63, the end chain block 65 has no following chain block and thus generates its output signal as a final detection signal DETH.

In the initialization mode, the smart card 100 receives an activated reset signal $\overline{\text{RESET}}$. The $\overline{\text{RESET}}$ signal is an active Low (L) signal. The start chain block 61 receives the supply voltage VDD under control of the activated reset signal $\overline{\text{RESET}}$. The start chain block 61 sets an initial detection value in response to the received supply voltage VDD. In addition, the start chain block 61 generates a control signal in response to the activated reset signal $\overline{\text{RESET}}$. In the initialization process, the control signal is an activated signal that is used to control the initial detection value of the next chain block 63.

The start chain block 61 outputs the initial detection value through its output terminal OUT_Data, and outputs the activated control signal through its output terminal OUT_En.

The intermediate chain block 63 connected to the start chain block 61 receives the initial detection value from the start chain block 61 through its input terminal IN_Data, and receives the activated control signal through its input terminals IN_En. In response to the received initial detection value and the activated control signal, the chain block 63 sets an internal initial detection value and generates an activated control signal. The chain block 63 outputs the initial detection value through its output terminal OUT_Data, and outputs the activated control signal through its output terminal OUT_En.

Thereafter, each of the intermediate chain blocks 63 receives an initial detection value and an activated control signal from the previous intermediate chain block 63 respectively through its input terminals IN_Data and IN_En, sets an internal initial detection value in response to the received initial value and the activated control signal, and generates an activated control signal. Each of the intermediate chain blocks 63 outputs the initial detection value through its output terminal OUT_Data, and outputs the activated control signal through its output terminal OUT_En. The end chain block 65 sets an internal initial detection value in response to the initial detection value and the activated control signal that are received from the previous intermediate chain block 63. The set initial detection value is a signal corresponding to a normal operational mode (hereinafter referred to as 'normal signal'). The end chain block 65 outputs the normal signal as the final detection signal DETH through its output terminal DetectionH.

At the conclusion of the initialization mode, the reset signal RESET is deactivated once the initial detection value of each of the chain blocks 61, 63 and 65 is set. The start chain block 61 generates a deactivated control signal in response to the deactivated reset signal $\overline{\text{RESET}}$, and provides the generated control signal to the next intermediate chain block 63.

Thereafter, each of the intermediate chain blocks 63 generates a deactivated control signal in response to the deactivated control signal received from the previous chain block (the start chain block 61 or a preceding intermediate chain block 63). In response to the deactivated control signal, each of the chain blocks 61 and 63 does not transmit a signal through its output terminal OUT_Data but holds an internal initial detection value by a bus holder (illustrated in FIGS. 3 through 5). The end chain block 65 holds the initial detection value by the bus holder, and outputs the normal detection signal as the final detection signal DETH through its output terminal DetectionH.

In the initialization mode, the reset logic 70 does not reset the circuits of the smart card 100 in response to the final detection signal DETH output from the laser attack detector 60.

In general, a dummy logic denotes a logic that operates in such a way that it does not affect a system in a normal mode. Therefore, the laser attack detector 60 operates as a dummy logic while the smart card 100 operates in the initialization mode. Following the initialization mode, the smart card 100 operates in a normal operation mode. In the normal operation mode, the reset logic 70 may reset the circuits of the smart card 100 in response to the final detection signal DETH output by the laser attack detector 60.

One or more of the chain blocks 61, 63 and 65 of the laser attack detector 60 may be provided for all of the function blocks (e.g., the memories 10, 40 and 50, the CPU 30, and the TX/RX interface 20) of the smart card 100. For example, the chain blocks 61, 63 and 65 may be connected to the input/output terminals of the respective function blocks of the smart card 100 to detect an external attack. Alternatively, the chain blocks 61, 63 and 65 can be included in the respective function blocks to detect an external attack on input/output signals thereof.

Therefore, when there is an external laser hacking attempt (i.e., an external laser attack) on any function block of the smart card 100 during the normal operation mode, a chain block associated with the attacked function block can change the level of an internal detection value in response to the laser light to thereby detect the external attack.

For example, when there is an external laser attack on any one of the CPU 30, the TX/RX interface 20, and/or the memories 10, 40 and 50, a chain block (e.g., the start chain block 61, the chain block 63, and/or the end chain block 65) associated with the attacked function block changes the level of an internal detection value in response to the laser. In addition, the chain block provided for the attacked function block can generate an activated control signal. The level-changed detection value corresponds to the result of detection of the external laser attack.

The level-changed detection value and the activated control signal are provided to the next chain block 63, 65 respectively through the output terminals OUT_Data and OUT_En of the chain block provided for the attacked function block. Thereafter, each of the chain blocks 63, 65 receives the level-changed detection value and the activated control signal from the previous chain block (i.e., the start chain block 61 or the intermediate chain block 63) respectively through its input terminals IN_Data and IN_En, changes the level of an internal detection value in response to the level-changed detection value and the activated control signal, and generates an activated control signal. Each of the intermediate chain blocks 63 outputs the level-changed detection value through its output terminal OUT_Data, and outputs the activated control signal through its output terminal OUT_En.

The end chain block 65 receives the level-changed detection value and the activated control signal from the previous intermediate chain block 63 respectively through its input terminals IN_Data and IN_En, and changes the level of an internal detection value in response to the level-changed detection value and the activated control signal. At this point, the level-changed detection value is a signal corresponding to the detection of a laser hacking attempt, that is, a signal corresponding to the hacking detection (hereinafter referred to as 'hacking detection signal'). The end chain block 65 outputs a hacking detection signal as the final detection signal DETH. The hacking detection signal of the end chain block 65 is a signal corresponding to the detection of an external laser attack. The reset logic 70 receives the final detection signal DETH from the end chain block 65 through the address/data bus 80, and may reset one or more of the circuits of the smart card 100 in response to the received final detection signal DETH.

As described above, the chain blocks 61, 63 and 65 may be provided for one or more of the function blocks of the smart card 100. Therefore, when there is an external laser hacking attempt (i.e., an external laser attack) on any function block of the smart card 100, one or more of the chain blocks 61, 63 and 65 may change the level of the internal detection value in response to the laser, thereby detecting the external laser attack.

Figure 3:
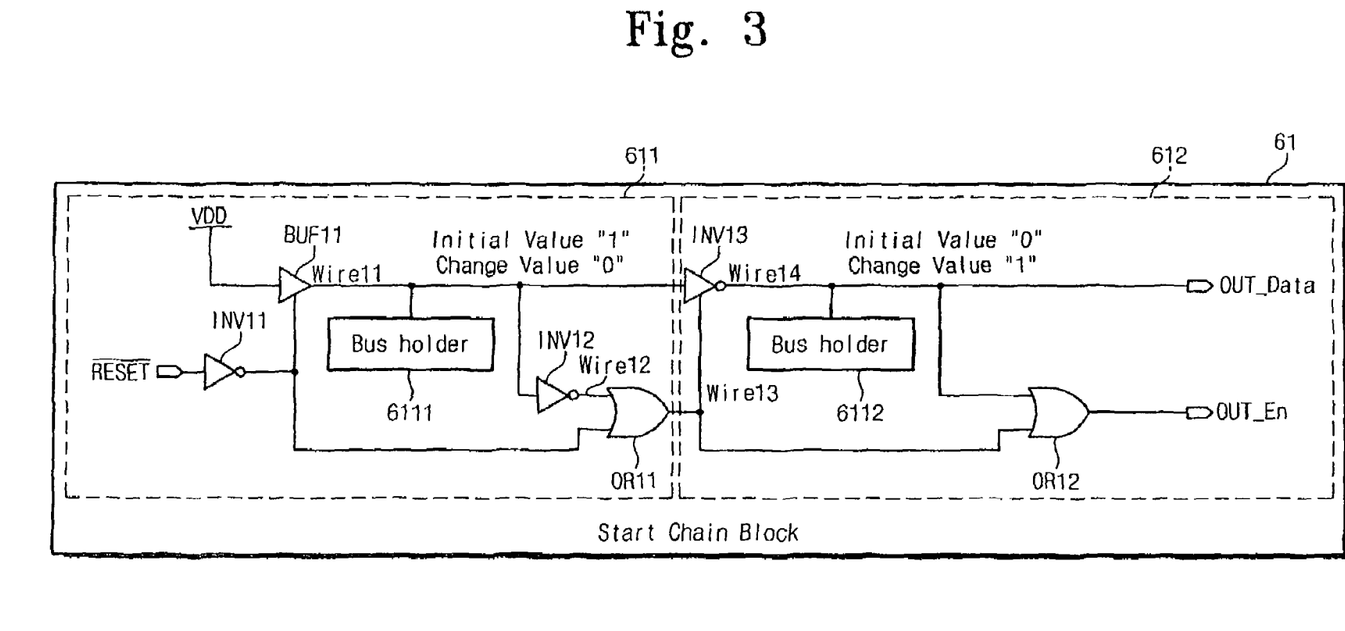
FIG. 3 is a circuit diagram of a start chain block illustrated in FIG. 2, according to some embodiments of the present invention.

FIG. 3 is a circuit diagram of an exemplary embodiment of a start chain block 61 illustrated in FIG. 2, according to some embodiments of the present invention.

Referring to FIG. 3, the start chain block 61 includes a first detector 611 and a second detector 612. The first detector 611 includes inverters INV11 and INV12, a buffer BUF11, an OR gate OR11, and a bus holder 6111. The second detector 612 includes an inverter INV13, an OR gate OR12, and a bus holder 6112.

Figure 4:
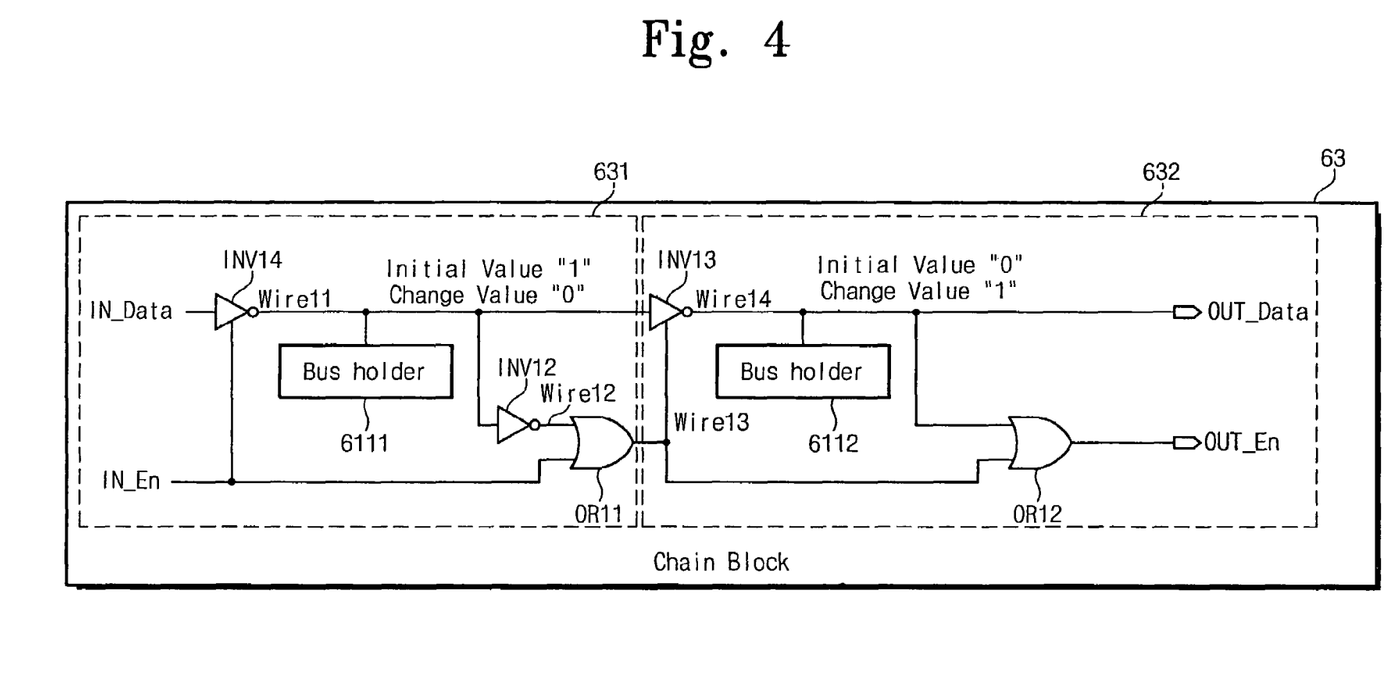
FIG. 4 is a circuit diagram of a chain block illustrated in FIG. 2, according to some embodiments of the present invention.

FIG. 4 is a circuit diagram of an exemplary embodiment of an intermediate chain block 63 illustrated in FIG. 2, according to some embodiments of the present invention.

Referring to FIG. 4, the intermediate chain block 63 includes a first detector 631 and a second detector 632. The first detector 631 includes inverters INV12 and INV14, an OR gate OR11, and a bus holder 6111. The second detector 632 includes an inverter INV13, an OR gate OR12, and a bus holder 6112.

Figure 5:
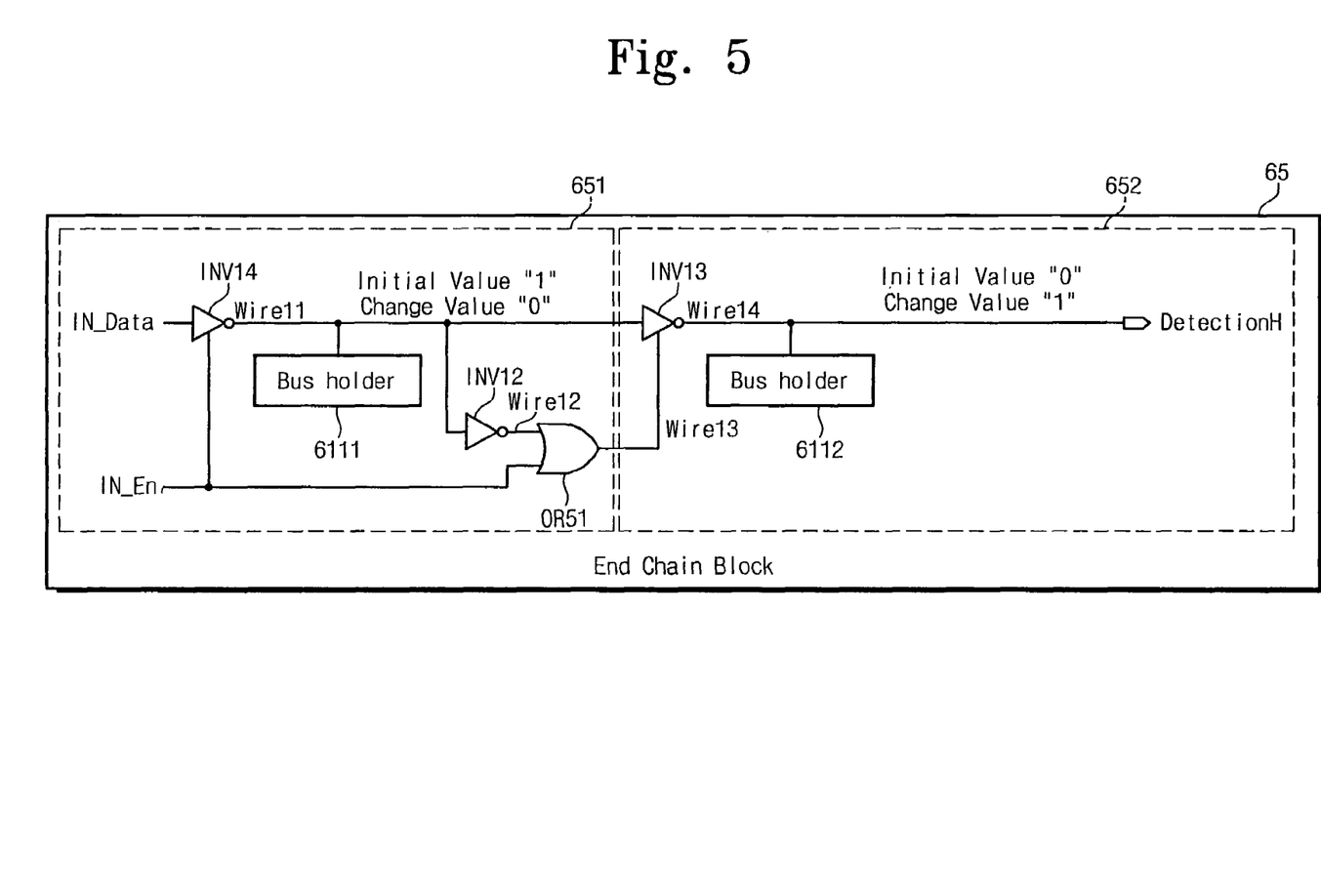
FIG. 5 is a circuit diagram of an end chain block illustrated in FIG. 2, according to some embodiments of the present invention.

FIG. 5 is a circuit diagram of an exemplary embodiment of an end chain block 65 illustrated in FIG. 2, according to some embodiments of the present invention.

Referring to FIG. 5, the end chain block 65 includes a first detector 651 and a second detector 652. The first detector 651 includes inverters INV12 and INV14, an OR gate OR11, and a bus holder 6111. The second detector 652 includes an inverter INV13 and a bus holder 6112.

Referring to FIGS. 3 through 5, a chain block 61/63/65 includes a first detector 611/631/651 and a second detector 612/632/652, each of which is configured to detect an external laser attack. The second detector 652 of the end chain block 65 outputs the final detection signal DETH, which will be described in detail below.

The chain blocks 61, 63 and 65 are substantially similar in terms of the structure for detecting an external laser attack but are somewhat different in terms of the structure for processing the input/output signals. Each of the intermediate chain blocks 63 receives a signal output from a previous chain block, generates a signal in response to the received signal, and outputs the generated signal to the next chain block. However, the start chain block 61 has no previous chain block because it is the first chain block among the chain blocks 61, 63 and 65. Therefore, unlike the intermediate chain block 63, the start chain block includes the inverter INV11 and the buffer BUF11 in order to receive the supply voltage VDD and the reset signal $\overline{RESET}$ in the initialization mode. The intermediate chain block 63 includes the inverter INV14 in place of the buffer BUF11 of the start chain block 61 but does not include the inverter INV11. The start chain block 61 and the intermediate chain block 63 are similar in terms of the remaining structures.

The end chain block 65 has no following chain block because it is the last chain block among the chain blocks 61, 63 and 65. Unlike the intermediate chain block 63, the end chain block 65 does not include the OR gate OR12 because it outputs only the final detection signal DETH through its output terminal DetectionH. The end chain block 65 and the intermediate chain block 63 are similar in terms of their other structures.

Figure 6:
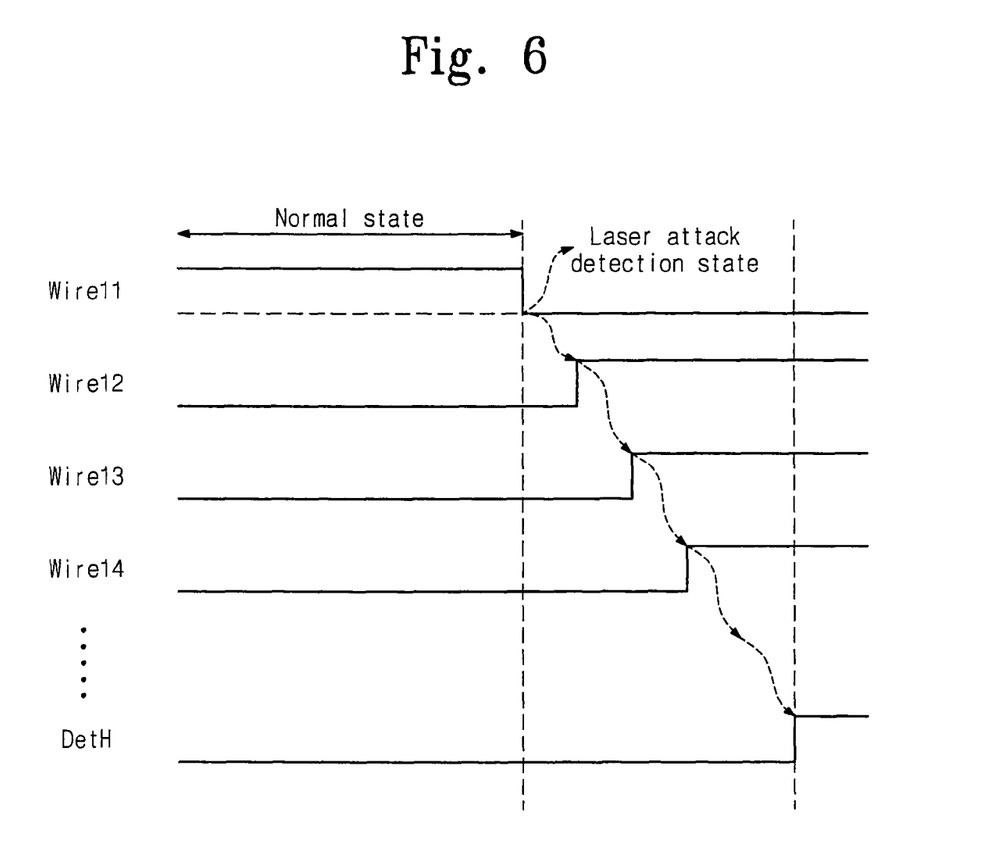
FIG. 6 is a timing diagram illustrating an operation of the laser attack detector according to some embodiments of the present invention.

FIG. 6 is a timing diagram illustrating operations of the laser attack detector 60 according to some embodiments of the present invention.

Hereinafter, the operation of the laser attack detector 60 according to some embodiments of the present invention will be described with reference to FIGS. 3 through 6.

Referring to FIGS. 3 through 6, in the initialization mode, the smart card 100 receives an activated (i.e. Low, or L) reset signal $\overline{RESET}$ and provides the activated reset signal $\overline{RESET}$ to the start chain block 61 of the laser attack detector 60. The inverter INV11 of the start chain block 61 inverts the received reset signal $\overline{RESET}$ and provides the inverted reset signal $\overline{RESET}$ to the second input terminal of the OR gate OR11. Because the activated reset signal $\overline{RESET}$ has a low (L) level, the second input terminal of the OR gate OR11 receives a high (H) level value. The buffer BUF11 is activated by the high (H) level of the inverted reset signal $\overline{RESET}$ Accordingly, the start chain block 61 receives a supply voltage VDD through the activated buffer BUF11. A wire Wire11 has a high level due to the received supply voltage VDD. Accordingly, the initial detection value of the first detector 611 of the start chain block 61 has a high (H) level.

The high-level initial detection value of the first detector 611 is held by the bus holder 6111 and is provided to the second detector 612. The high-level initial detection value of the first detector 611 is changed into a low level by the inverter INV13 of the second detector 612. Thus, the wire Wire12 has a low level, and the low-level signal is input to the first input terminal of the OR gate OR11.

The first input terminal of the OR gate OR11 receives a low-level signal, while the second input terminal of the OR gate OR11 receives a high-level signal. Accordingly, the OR gate OR11 logically combines the low-level signal and the high-level signal and responsively generates a high-level output signal. A wire Wire13 of the second detector 612 has a high level due to the high-level signal generated by the OR gate OR11.

The high-level signal of the wire Wire13 is a control signal generated by the first detector 611/631/651, and has the same meaning as an activated first control signal. An operation is performed to provide the second detector 612 with the initial detection value of the first detector 611, which will be described in detail below.

The high-level signal of the wire Wire13 is provided to the second input terminal of the OR gate OR12. The inverter INV13 is activated by the high-level signal of the wire Wire13. Accordingly, a wire Wire14 has a low level because the second detector 612 inverts the high-level initial detection value of the first detector 611 into a low-level value by the inverter INV13. Because the wire Wire14 has a low level, the initial detection value of the second detector 612 of the start chain block 61 has a low level. Thus, the initial detection value of the start chain block 61 has a low level.

The low-level signal of the wire Wire14 is held by the bus holder 6112 and is provided to the next intermediate chain block 63 through an output terminal OUT_Data. In addition, the low-level signal of the wire Wire14 is provided to the first input terminal of the OR gate OR12.

The OR gate OR12 receives a low-level signal and a high-level signal through its first input terminal and the second input terminal, respectively. Accordingly, the OR gate OR12 logically combines the low-level signal and the high-level signal and responsively generates a high-level output signal. The generated high-level signal is the activated control signal generated by the start chain block 61, which has been described above. The high-level signal generated by the OR gate OR12 is provided to the next intermediate chain block 63 through an output terminal OUT_En. The high-level signal output through the output terminal OUT_En has the same meaning as an activated second control signal.

Referring to FIG. 4, The inverter INV14 is activated by a high-level signal received through an input terminal IN_En. A low-level signal received through an input terminal IN_Data is inverted into a high-level signal by the activated inverter INV14. Accordingly, a wire Wire11 of the first detector 631 has a high level. Because the wire Wire11 of the first detector 631 has a high level, the initial detection value of the first detector 631 has a high level. An operation for setting the initial detection value of the second detector 632 in the chain block 63 is similar to the above-described operation for setting initial detection value of the second detector 612 in the start chain block 61, and thus its description will be omitted for conciseness.

Operations for setting the initial detection values of the first and second detectors 651 and 652 in the end chain block 65 are substantially similar to the operations for setting the initial detection values of the first and second detectors 631 and 632 in the chain block 63. Because the second detector 652 of the end chain block 65 does not include the OR gate OR12, it does not generate a control signal and outputs a signal, which corresponds to an initial detection value held by the bus holder 6112, as a final detection signal DETH through an output terminal DetectionH.

Consequently, the initial detection value of the first detector 611/631/651 in the chain block 61/63/65 is set to a high level, and the initial detection value of the second detector 612/632/652 in the chain block 61/63/65 is set to a low level. The initial detection value of the first detector 611/631/651 is referred to as the first initial detection value, and the initial detection value of the second detector 612/632/652 is referred to as the second initial detection value. The detection value of a chain block 61/63/65 corresponds to the second detection value of the second detector 612/632/652.

At the conclusion of the initialization process, the reset signal $\overline{\text{RESET}}$ is deactivated after the initial detection values of the first detector 611/631/651 and the second detector 612/632/652 in the chain block 61/63/65 have been set. The start chain block 61 receives the deactivated reset signal RESET. The inverter INV11 of the start chain block 61 inverts the received reset signal RESET, and provides the inverted reset signal $\overline{\text{RESET}}$ to the second input terminal of the OR gate OR11. Because the deactivated reset signal $\overline{\text{RESET}}$ has a high level, the second input terminal of the OR gate OR11 receives a low-level signal. The buffer BUF11 is turned off because the inverted reset signal $\overline{\text{RESET}}$ has a low level. Accordingly, the supply voltage VDD input into the start chain block 61 is interrupted.

The first detector 611 of the start chain block 61 holds the high-level initial detection value using the bus holder 6111. Therefore, as described above, the wire Wire11 and the wire Wire12 have a high level and a low level, respectively. The low-level signal of the wire Wire12 is provided to the first input terminal of the OR gate OR11.

The OR gate OR11 receives low-level signals through the first and second input terminals. Accordingly, the OR gate OR11 logically combines the two low-level signals and responsively generates a low-level output signal. The wire Wire13 has a low level due to the low-level signal generated by the OR gate OR11. The low-level signal of the wire Wire13 is provided to the second input terminal of the OR gate OR11. In addition, the inverter INV13 is turned off by the low-level signal of the wire Wire13. Accordingly, the initial detection value of the first detector 611 is not provided to the second detector 612. The second detector 612 of the start chain block 61 holds the low-level initial detection value using the bus holder 6112. Therefore, as described above, the wire Wire14 has a low level, and the OR gate OR12 receives the low-level signal of the wire Wire14 through the first input terminal.

The OR gate OR12 receives low-level signals through the first and second input terminals. Accordingly, the OR gate OR12 logically combines the two low-level signals and responsively generates a low-level output signal. The low-level signal generated by the OR gate OR12 is a deactivated control signal, which is provided to the next intermediate chain block 63 through the output terminal OUT_En.

The intermediate chain block 63 receives a low-level signal through an input terminal IN_En.

The inverter INV14 of the intermediate chain block 63 is deactivated by the low-level signal received through the input terminal IN_En. Accordingly, the initial detection value of the second detector 612 is not provided to the next chain block 63.

The subsequent operations of the intermediate chain block 63 and the end chain block 65 are similar to those of the start chain block 61. Therefore, each of the chain blocks 61, 63 and 65 does not provide a detection value to the next chain block but holds the detection value by the bus holders 6111 and 6112. In addition, as illustrated in a normal state section of FIG. 6, while the smart card 100 operates in the normal state, the chain blocks 61, 63 and 65 set the initial detection values and then hold the high level of the wire Wire11 and the low level of the wires Wire12, Wire13 and Wire 14. Accordingly, the second detector 652 of the end chain block 65 outputs the low-level initial detection value held by the bus holder 6112 as a final detection signal DETH. As illustrated in FIG. 6, while the smart card 100 operates in the normal state, the wire Wire11 is held at a high level, the wires Wire12, Wire13 and Wire14 are held at a low level, and the final detection signal DETH is held at a low level.

The low-level initial detection value held by the bus holder 6112 is a normal signal. The normal signal indicates that the smart card 100 operates normally, and that no external attack has been detected.

While the smart card 100 operates in the normal state, the reset logic 70 does not reset the circuits of the smart card 100 in response to a normal (i.e., low-level) signal output from the laser attack detector 60.

The chain blocks 61, 63 and 65 of the laser attack detector 60 may be provided for one or more, and in some embodiments all, of the function blocks of the smart card 100. When there is an external laser attack on a function block of the smart card 100, the detection values of the first and second detectors in the chain block (e.g., the start chain block 61, the chain block 63, or the end chain block 65), which is provided for the attacked function block, are changed in response to the laser light.

A description will now be given of a case where the detection values of the first detectors 611, 631 and 651 are changed. When there is an external laser attack, the on/off states of internal transistors in the buffer BUF11 of the first detector 611 and in the inverters INV14 of the first detectors 631 and 651 may be changed. In this condition, the high-level initial detection values of the wires Wire11 are discharged to the ground level through the internal transistors whose on/off states have been changed. In this case, because the wires Wire11 of the first detectors 611, 631 and 651 have a low level, the high-level initial detection values of the first detectors 611, 631 and 651 are changed into low-level detection values.

When the chain block provided for the attacked function block is an intermediate chain block 63, the high-level initial detection value held by the first detector 631 is changed into a low-level value.

Accordingly, as illustrated in FIG. 6, the wire Wire11 is changed into a low level. The low-level signal of the wire Wire11 is provided to the second detector 612. The low-level signal of the wire Wire11 is changed into a high-level signal by the inverter INV12, and the high-level signal is input into the first input terminal of the OR gate OR11. Thus, the wire Wire12 is changed into a high level as illustrated in FIG. 6. The high-level signal of the wire Wire12 is a signal with a predetermined delay due to the inverter INV12. At this point, the reset signal $\overline{\text{RESET}}$ has a high level, and the high-level reset signal RESET is inverted into a low-level signal by the inverter INV11. The inverted low-level signal is provided to the second input terminal of the OR gate OR11.

The OR gate OR11 receives a high-level signal and a low-level signal through the first input terminal and the second input terminal, respectively. Accordingly, the OR gate OR11 logically combines the high-level signal and the low-level signal and responsively generates a high-level output signal. Therefore, as illustrated in FIG. 6, the wire Wire13 of the second detector 612 has a high level due to the high-level signal generated by the OR gate OR11. The high-level signal of the wire Wire13 is a signal with a predetermined delay due to the OR gate OR11.

The high-level signal of the wire Wire13 is provided to the second input terminal of the OR gate OR12. In addition, the inverter INV13 is activated by the high-level signal of the wire Wire13. Using the activated inverter INV13, the second detector 612 inverts the low-level signal received from the first detector 611 into a high-level signal. Therefore, as illustrated in FIG. 6, the wire Wire14 has a high level. The high-level signal of the wire Wire14 is generated after the inverter INV13 is activated by the high-level signal of the wire Wire13. The high-level signal of the wire Wire14 is a signal with a predetermined delay due to the inverter INV13.

Because the wire Wire14 has a high level, the detection value of the second detector 612 of the start chain block 61 is changed from low level to high level. The high-level signal of the wire Wire14 is provided to the next chain block 63 through an output terminal OUT_Data.

The OR gate OR12 receives the high-level signal of the wire Wire14 and the high-level signal of the wire Wire13 through the first input terminal and the second input terminal, respectively. Accordingly, the OR gate OR11 logically combines the two high-level signals and responsively generates a high-level output signal. The high-level signal generated by the OR gate OR12 is provided to the next chain block 63 through an output terminal OUT_En.

The input terminal IN_Data of the intermediate chain block 63 receives the high-level signal output through the output terminal OUT_Data of the previous intermediate chain block 63, and the input terminal IN_En of the next intermediate chain block 63 receives the high-level signal output through the output terminal OUT_En of the previous intermediate chain block 63. The inverter INV14 of the next intermediate chain block 63 is activated by the high-level signal received through the input terminal IN_En. Because the high-level signal received through the input terminal IN_Data is inverted into a low-level signal by the inverter INV14, the wire Wire11 of the first detector 631 has a low level. Because the wire Wire11 of the first detector 631 has a low level, the high-level initial value of the first detector 631 is changed into a low level. Subsequent operations for changing the values of the wires Wire12, Wire13 and Wire14 according to a change in the detection values of the first and second detectors 631 and 632 are similar to those in the previous chain block 63, and thus their description will be omitted for conciseness.

A description will now be given of a case where the detection values of the second detectors 612, 632 and 652 are changed. When there is an external laser attack, the on/off states of internal transistors in the inverters INV13 of the second detectors 612, 632 and 652 are changed. All the devices illustrated in FIGS. 3 through 5 are supplied with an operating voltage (not illustrated) for an on-state operation. The inverters INV13 supplies the operating voltage to the wires Wire14 through the internal transistors whose on/of states have been changed. The wires Wire14 supplied with the operating voltage are charged so that the low-level initial detection value is changed into the high-level detection value. In this case, because the wires Wire14 of the second detectors 612, 632 and 652 have a high level, the low-level initial values of the second detectors 612, 632 and 652 are changed into high-level values.

When the low-level initial detection value held by the second detector 631 of the chain block 63 is changed into a high-level detection value as a result of an external laser attack, the subsequent operations for changing the levels of the detection values of the first and second detectors 631 and 632 of the chain block 63 are similar to the afore-described operations for changing the levels of the detection values of the first and second detectors 631 and 632 of the chain block 63, and thus their description will be omitted for conciseness.

Operations for changing the levels of the detection values of the first and second detectors 651 and 652 of the end chain block 65 are similar to the operations for changing the levels of the detection values of the first and second detectors 631 and 632 of the intermediate chain block 63. Therefore, when an external attack is detected, the detection value of the first detector 651 of the end chain block 65 is changed into a low level and the detection value of the second detector 652 is changed into a high level. Accordingly, as illustrated in FIG. 6, the second detector 652 of the end chain block 65 outputs a high-level value as a final detection signal DETH through an output terminal DetectionH.

The high-level signal output from the second detector 652 of the end chain block 65 is a hacking detection signal.

The reset logic 70 receives the hacking detection signal from the end chain block 65 through the address/data bus 80, and may reset one or more of the circuits of the smart card 100 in response to the received hacking detection signal.

As described above, when there is an external laser attack, the chain block 61/63/65 can detect the external attack and change the detection value thereof using the first detector 611/631/651 and/or the second detector 612/632/652.

Figure 7:
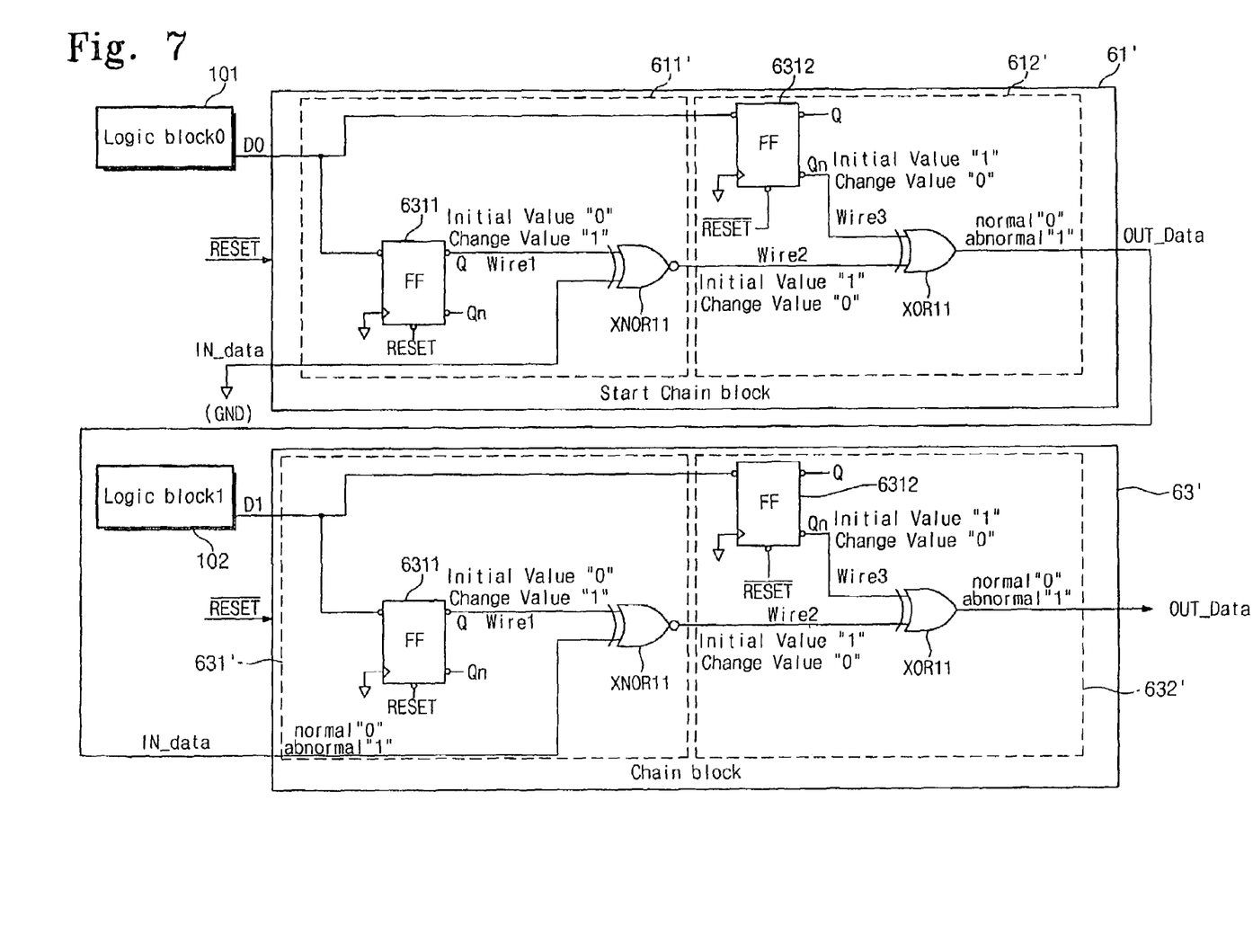
FIG. 7 is a circuit diagram of the chain block illustrated in FIG. 2, according to other embodiments of the present invention.

FIG. 7 is a circuit diagram of the chain block illustrated in FIG. 2, according to other embodiments of the present invention.

As illustrated in FIG. 7, a start chain block 61', an intermediate chain block 63', and an end chain block (not illustrated) have similar structures and are configured to detect an external laser attack using the similar structures. However, the start chain block 61' has no previous chain block and thus receives a low-level signal (i.e., a ground voltage GND) through an input terminal IN_Data. The end chain block has no following chain block and thus outputs its output signal as the final detection signal.

Referring to FIG. 7, the chain block 61'/63' includes a first detector 611'/631' and a second detector 612'/632'. The first detector 611'/631' includes a flip-flop (FF) 6311 and an XNOR gate XNOR11. The second detector 612'/632' includes a flip-flop 6312 and an XOR gate XOR11.

The start chain block 61' is connected to a data output terminal D0 of a logic block 101, and the chain block 63' is connected to a data output terminal D1 of a logic block 102. The logic blocks 101 and 102 can be any blocks of the smart card 100. For example, each of the logic blocks 101 and 102 may be any one of the memories 10, 40 and 50, the TX/RX interface 20, and/or the CPU 30.

In the initialization mode, the smart card 100 receives an activated (i.e. low or L) reset signal $\overline{\text{RESET}}$ and provides the received reset signal $\overline{\text{RESET}}$ to the start chain block 61'. The FF 6311 of the start chain block 61' receives the reset signal $\overline{\text{RESET}}$ through a reset terminal RESET, and outputs a low-level signal through an output terminal Q in response to the received reset signal $\overline{\text{RESET}}$. Accordingly, a wire Wire1 has a low level. Because the wire Wire1 has a low level, the initial detection value of the first detector 611' has a low level. The low-level signal of the wire Wire1 is provided to the first input terminal of the XNOR gate XNOR11.

The input terminal IN_Data of the start chain block 61' receives a low-level signal through a ground voltage. The received low-level signal is provided to the second input terminal of the NNOR gate XNOR11.

The XNOR gate XNOR11 receives low-level signals through the first and second input terminals, and logically combines the two low-level signals and responsively generates a high-level output signal. Accordingly, a wire Wire2 has a high level. The high-level signal of the wire Wire2 is provided to the second input terminal of the XOR gate XOR11.

The FF 6312 of the start chain block 61' receives a reset signal RESET through a reset terminal RESET, and outputs a high-level signal through an output terminal Q in response to the received reset signal $\overline{\text{RESET}}$. Accordingly, a wire Wire3 has a high level. Because the wire Wire3 has a high level, the initial detection value of the second detector 612' has a high level. The high-level signal of the wire Wire3 is provided to the first input terminal of the XOR gate XOR11.

The XOR gate XOR11 receives high-level signals through the first and second input terminals, and logically combines the two high-level signals and responsively generates a low-level output signal. The low-level signal of the XOR gate XOR11, which constitutes the initial detection value of the start chain block 61', is provided to the next chain block 63' through the output terminal OUT_Data of the start chain block 61'. The output low-level signal indicates that the smart card 100 operates in the normal state, i.e., that no external laser attack has been detected.

The intermediate chain block 63' receives a reset signal RESET and receives the low-level signal from the start chain block 61' through an input terminal IN_Data. An operation for setting the initial detection value of the intermediate chain block 63' and/or the end chain block is similar to the operation for setting the initial detection value of the start chain block 61', and thus its description will be omitted for conciseness. Consequently, a second detector of the end chain block outputs a low-level final detection signal. The low-level signal output from the second detector of the end chin block is a normal signal indicating that the smart card 100 operates in the normal state.

When there is an external laser attack on the logic block 101, the detection value of the first or second detector 611' or 612' of the start chain block 61' provided for the attacked logic block 101 is changed in response to the laser light. When the low-level initial detection value of the first detector 611' is changed into a high-level detection value by the laser light, the wire Wire1 has a high level. The high-level signal of the wire Wire1 is provided to the first input terminal of the XNOR gate XNOR11. The XNOR gate XNOR11 receives a low-level signal from a ground voltage GND through the second input terminal. Accordingly, the XNOR gate XNOR11 logically combines the received high-level signal and the received low-level signal and responsively generates a low-level output signal. Because the XNOR gate XNOR11 outputs the low-level signal, the wire Wire2 is changed into a low level.

The low-level signal of the wire Wire2 is provided to the second input terminal of the XOR gate XOR11. The first input terminal of the XOR gate XOR11 receives the high-level signal of the wire Wire3. Accordingly, the XOR gate XOR11 logically combines the received high-level signal and the received low-level signal and responsively generates a high-level output signal as a changed detection signal of the start chain block 61'. At this point, the output high-level signal indicates that the smart card 100 operates abnormally due to an external laser attack.

The high-level signal output from the XOR gate XOR11 is provided to the intermediate chain block 63' through the output terminal OUT_Data of the start chain block 61'. The intermediate chain block 63' receives the high-level signal from the output terminal OUT_Data of the start chain block 61' through an input terminal IN_Data. The input high-level signal is provided to the second input terminal of the XNOR gate XNOR11. Because the wire Wire1 of the first detector 631' of the intermediate chain block 63' is a low level set to the initial detection value, the XNOR gate XNOR11 receives a low-level signal through the first input terminal. Accordingly, the XNOR gate XNOR11 logically combines the received high-level signal and the received low-level signal and responsively generates a low-level output signal. Because the XNOR gate XNOR11 outputs the low-level signal, the wire Wire2 is changed into a low level. The subsequent operations of the intermediate chain block 63' are similar to the aforedescribed operations of the start chain block 61'.

Accordingly, each intermediate chain block 63' outputs a high-level signal through an output terminal OUT_Data, and the end chain block outputs a high-level signal through an output terminal. At this point, the output high-level signal indicates that the smart card 100 operates abnormally due to an external laser attack. Accordingly, the high-level signal output from the end chain block is a hacking detection signal.

When the high-level initial detection value of the second detector 612' of the start chain block 61' is changed into a low-level value by laser light, the wire Wire3 is changed into a low level. The low-level signal of the wire Wire3 is provided to the first input terminal of the XOR gate XOR11. The second input terminal of the XOR gate XOR11 receives the high-level signal of the wire Wire2. Accordingly, the XOR gate XOR11 logically combines the received high-level signal and the received low-level signal and responsively generates a high-level output signal, which corresponds to the detection value of the start chain block 61'. The high-level signal output from the XOR gate XOR11 is provided to the intermediate chain block 63' through the output terminal OUT_Data of the start chain block 61'. The intermediate chain block 63' receives the high-level signal from the output terminal OUT_Data of the start chain block 61' through an input terminal IN_Data. The subsequent operations for changing the level of the initial detection value of the intermediate chain block 63' are already described, and thus their description will be omitted for conciseness.

Consequently, each intermediate chain block 63' outputs a high-level signal through an output terminal OUT_Data, and the end chain block outputs a high-level signal through an output terminal. At this point, the output high-level signal indicates that the smart card 100 operates abnormally due to an external laser attack. Accordingly, the high-level signal output from the end chain block is a hacking detection signal.

The reset logic 70 receives the hacking detection signal from the end chain block through the address/data bus 80, and may reset one or more of the circuits of the smart card 100 in response to the received hacking detection signal.

When there is an external laser attack on the logic block 102, an operation is performed to detect the external attack on the intermediate chain block 63' provided for the attacked logic block 102. This operation is similar to the operation for detecting the external attack on the start chain block 61' provided for the attacked logic block 101.

As described above, the chain blocks of the laser attack detector can be provided for one or more, and in some embodiments all of, the blocks of the smart card 100. Therefore, when there is an external laser hacking attempt (i.e., an external laser attack) on any block of the smart card, the level of the internal initial value is changed by laser, thereby detecting the external attack.

According to some embodiments of the present invention, a smart card with the laser attack detector can detect an external laser attack on one or more of the function blocks therein, thereby making it possible to more quickly respond to a hacking attack.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A smart card comprising:
a central processing unit (CPU);
a memory configured to store data and/or instructions processed by the CPU;
a TX/RX interface configured to exchange data with an external device; and
a laser attack detector configured to detect an external laser attack on at least one of the CPU, the memory, and/or the TX/RX interface,
wherein the laser attack detector includes a plurality of chain blocks connected in a chain configuration, and wherein each of the chain blocks is configured to change the level of a detection value stored therein in response to an external laser attack.

2. The smart card of claim 1, wherein the smart card comprises a plurality of function blocks, and wherein at least one of the plurality of chain blocks is associated with each of the plurality of function blocks of the smart card.

3. The smart card of claim 1, wherein the laser attack detector is configured to operate as a dummy logic during an initialization mode of the laser attack detector.

4. The smart card of claim 1, wherein initial detection values of each of the plurality of chain blocks have the same level.

5. The smart card of claim 1, wherein the detection value of a last chain block of the plurality of chain blocks comprises a hacking detection signal.

6. The smart card of claim 5, wherein the CPU is configured to perform a reset operation in response to the hacking detection signal.

7. The smart card of claim 5, further comprising a reset logic configured to reset the smart card in response to the hacking detection signal.

8. The smart card of claim 1, wherein, in an initialization mode, at least one of the chain blocks is configured to set an initial detection value therein in response to an initial detection value of a previous chain block in the chain configuration and an activated control signal generated by the previous chain block, and to generate an activated control signal.

9. The smart card of claim 8, wherein, in response to a supply voltage and a reset signal, a first one of the plurality of chain blocks is configured to set an initial detection value therein and to generate an activated control signal.

10. The smart card of claim 8, wherein a last one of the plurality of chain blocks is configured to set an initial detection value therein in response to the control signal and an initial detection value of a previous chain block in the chain configuration.

11. The smart card of claim 1, wherein, when at least one of the chain blocks detects the external laser attack, the at least one chain block having detected the external laser attack is configured to change a level of a detection value therein and to generate an activated control signal.

12. The smart card of claim 11, wherein one or more of the plurality of chain blocks following the chain block having detected the external laser attack is configured to change the level of the detection value therein in response to the activated control signal and the level-changed detection value of a previous chain block of the chain configuration, and to generate the activated control signal.

13. The smart card of claim 12, wherein a last chain block of the plurality of chain blocks is configured to change a level of a detection value therein in response to the activated control signal and the level-changed detection value of a previous chain block.

14. The smart card of claim 1, wherein each of the chain blocks is configured to set an initial detection value therein in response to a reset signal during an initialization mode.

15. The smart card of claim 14, wherein at least one of the chain blocks comprises a flip-flop (FF) configured to set an initial detection value therein in response to the reset signal.

16. The smart card of claim 1, wherein, when at least one of the plurality of chain blocks detects the external laser attack, the at least one chain block having detected the external laser attack is configured to change the level of the detection value therein.

17. The smart card of claim 16, wherein chain blocks following the chain block having detected the external laser attack are configured to change a level of the initial detection value therein in response to the level-changed detection value of the previous chain block.

18. The smart card of claim 1, wherein each of the chain blocks comprises:
a first detector configured to set an initial value of a first detection value and to generate an activated first control signal in an initialization mode; and
a second detector configured to set an initial value of a second detection value and to generate an activated second control signal in the initialization mode.

19. The smart card of claim 18, wherein the initial first detection value and the initial second detection value have different levels.

20. The smart card of claim 18, wherein, in the initialization mode, the first detector is configured to set the initial first detection value and to generate the first control signal in response to the second control signal and the initial second detection value of a previous chain block, and the second detector is configured to set the initial first detection value and to generate the second control signal in response to the first control signal and the first initial detection value of the first detector.

21. The smart card of claim 18, wherein the first detector of a first chain block among the plurality of chain blocks is configured to set the initial first detection value and to generate the first control signal in response to a supply voltage and a reset signal.

22. The smart card of claim 18, wherein the second detector of a last chain block among the plurality of chain blocks is configured to set the initial second detection value in response to the first control signal and the initial first detection value of the first detector.

23. The smart card of claim 18, wherein, when detecting the external laser attack, the first and/or second detector of at least one of the chain blocks is configured to change the level of the first and/or second detection value and to generate the activated first or second control signal.

24. The smart card of claim 23, wherein, when the level of the first detection value is changed, the second detector is configured to change the level of the second detection value and to generate the second control signal in response to the level-changed first detection value and the first control signal.

25. The smart card of claim 24, wherein the first detector of each of the chain blocks following the chain block having detected the external laser attack is configured to change the level of the first detection value and to generate the first control signal in response to the level-changed second detection value and the second control signal of the previous chain block, and the corresponding second detector is configured to change the level of the second detection value and to generate the second control signal in response to the level-changed first detection value and the first control signal.

26. The smart card of claim 25, wherein the second detector of the last chain block among the chain blocks is configured to change the level of the second detection value in response to the first control signal and the level-changed first detection value.

27. The smart card of claim 26, wherein the level-changed second detection value of the last chain block comprises a hacking detection signal.

28. The smart card of claim 1, wherein each of the chain blocks comprises:
 a first detector configured to set an initial first detection value in response to a reset signal in an initialization mode; and
 a second detector configured to set an initial second detection value in response to the reset signal in the initialization mode.

29. The smart card of claim 28, wherein the initial first detection value and the initial second detection value have different levels.

30. The smart card of claim 28, wherein the first and/or second detector includes a flip-flop (FF) configured to set the initial first and/or second detection value in response to the reset signal.

31. The smart card of claim 28, wherein, upon detecting the external laser attack, the first or second detector of at least one of the chain blocks is configured to change the level of the first or second detection value.

32. The smart card of claim 31, wherein, when the level of the first detection value is changed, the second detector is configured to change the level of the second detection value in response to the level-changed first detection value.

33. The smart card of claim 32, wherein the first detector of each of the chain blocks following the chain block having detected the external laser attack is configured to change the level of the first detection value in response to the level-changed second detection value of the previous chain block, and the corresponding second detector is configured to change the level of the second detection value in response to the level-changed first detection value.

34. The smart card of claim 33, wherein the level-changed second detection value of the last chain block among the chain blocks comprises a hacking detection signal.

35. A smart card comprising:
 a plurality of function blocks; and
 a laser attack detector configured to detect an external laser attack on at least one of the plurality of function blocks,
 wherein the laser attack detector includes a plurality of chain blocks connected in a chain configuration, and wherein each of the chain blocks is configured to change the level of a detection value stored therein in response to an external laser attack.

* * * * *